United States Patent
Bonen et al.

(10) Patent No.: US 8,959,266 B1
(45) Date of Patent: Feb. 17, 2015

(54) DYNAMIC PRIORITY CONTROL BASED ON LATENCY TOLERANCE

(71) Applicants: Nadav Bonen, Ofer (IL); Todd M. Witter, Orangevale, CA (US); Eran Shifer, Tel Aliv (IL); Tomer Levy, Tel Aviv (IL); Zvika Greenfield, Kfar Sava (IL); Anant V. Nori, Bangalore (IN)

(72) Inventors: Nadav Bonen, Ofer (IL); Todd M. Witter, Orangevale, CA (US); Eran Shifer, Tel Aliv (IL); Tomer Levy, Tel Aviv (IL); Zvika Greenfield, Kfar Sava (IL); Anant V. Nori, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/957,843

(22) Filed: Aug. 2, 2013

(51) Int. Cl.
  *G06F 3/06* (2006.01)
  *G06F 3/14* (2006.01)
  *G06F 5/00* (2006.01)

(52) U.S. Cl.
  CPC ............ *G06F 3/0653* (2013.01); *G06F 3/0611* (2013.01); *G06F 3/0671* (2013.01); *G06F 3/14* (2013.01)
  USPC ............ 710/57; 710/2; 710/5; 710/8; 710/14

(58) Field of Classification Search
  None
  See application file for complete search history.

(56) References Cited

U.S. PATENT DOCUMENTS

| | | | |
|---|---|---|---|
| 2006/0022985 A1* | 2/2006 | Shepherd et al. | 345/535 |
| 2011/0302345 A1* | 12/2011 | Boucard et al. | 710/123 |

* cited by examiner

*Primary Examiner* — Scott Sun
(74) *Attorney, Agent, or Firm* — Lowenstein Sandler LLP

(57) ABSTRACT

A dynamic priority controller monitors a level of data in a display engine buffer and compares the level of data in the display engine buffer to a plurality of thresholds including a first threshold and a second threshold. When the level of data in the display engine buffer is less than or equal to the first threshold, the dynamic priority controller increases a priority for processing display engine data in a communication channel. When the level of data in the display engine buffer is greater than or equal to the second threshold, the dynamic priority controller decreases the priority for processing the display engine data in the communication channel.

17 Claims, 9 Drawing Sheets

DYNAMIC PRIORITY CONTROL BASED ON LATENCY TOLERANCE

TECHNICAL FIELD

This disclosure relates to the field of processing devices and, in particular, to dynamic priority control based on latency tolerance.

BACKGROUND

A communication channel may be used to transfer data between client devices and memory. Depending on the client device, latency in the transfer of data across the communication channel can be detrimental. For example, if the client device is a display engine running a display, excess latency can negatively affect the visual output on the display, causing a lag or buffering. In some cases the communication channel may be shared by multiple client devices including the display engine. Conventional systems prioritize data transfers associated with the display engine above all other data on the communication channel in order to avoid display latency, which may be visually observed on a display screen. This comes at the expense of the other client devices utilizing the communication channel and can harm the performance of those other client devices.

BRIEF DESCRIPTION OF THE DRAWINGS

The present disclosure is illustrated by way of example, and not by way of limitation, in the figures of the accompanying drawings.

DETAILED DESCRIPTION

Figure 1:
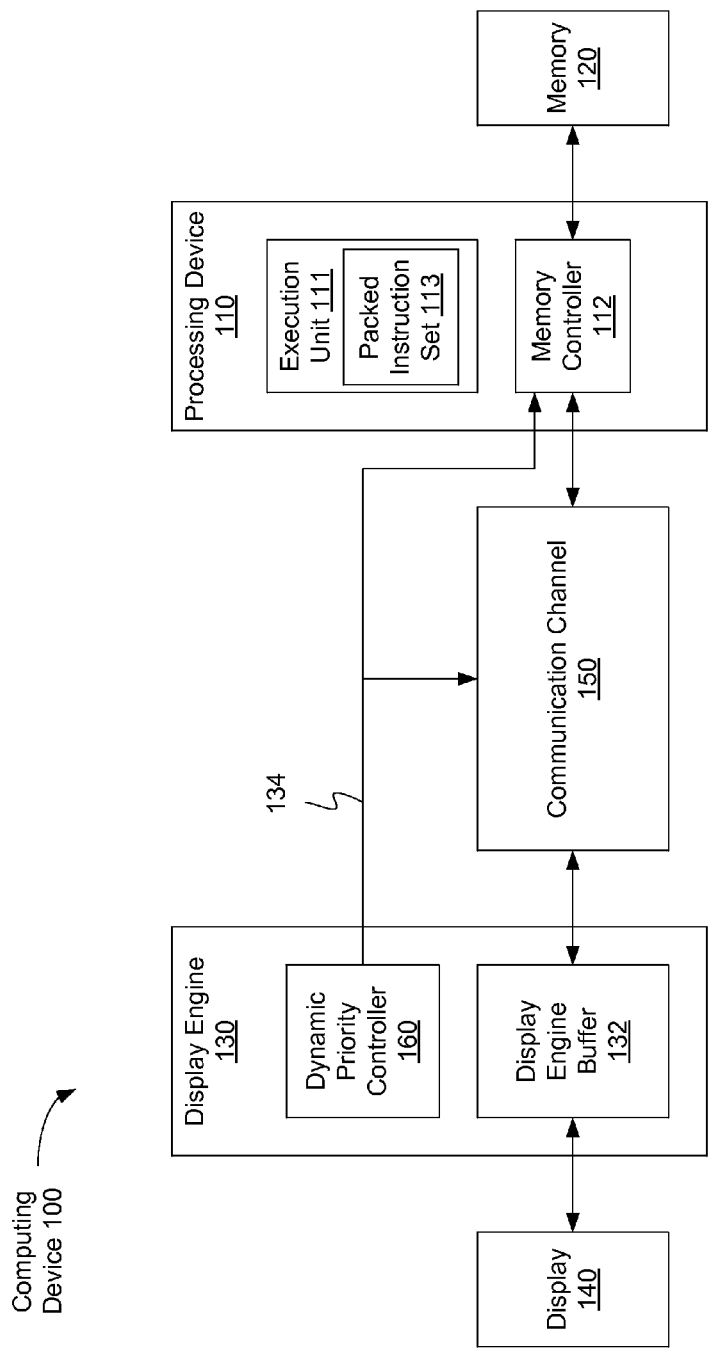
FIG. 1 is a block diagram illustrating a computing device that dynamic priority control based on latency tolerance, according to an embodiment.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Described herein is a system and method for dynamic priority control based on latency tolerance. In one embodiment, a dynamic priority controller in a client device monitors the latency tolerance of the client device and dynamically adjusts the priority of data transfers associated with the client device accordingly. For example, the client device may be a display engine that drives a display in a computing device. The display engine may include a display engine buffer that stores requested data prior to being displayed. The requested data may be received from a memory or memory controller (e.g., within a processing device) located elsewhere in the computing device. Requests for the data and the data itself may be transferred over a communication channel between the display engine and the memory controller. In one embodiment, the communication channel may be shared by multiple client devices, including the display engine and/or multiple data sources including the memory controller.

In one embodiment, the dynamic priority controller monitors the level of data in the display engine buffer and compares the level of data to multiple thresholds. The thresholds can be used to determine whether to adjust the priority of data transfers associated with the display engine being sent across the communication channel. For example, a first threshold may be set to indicate when the level of data in the display engine buffer is getting low. When the dynamic priority controller compares the level of data in the display engine buffer to the first threshold and determines that the level of data in the display engine buffer is less than or equal to the first threshold, the dynamic priority controller may increase the priority of data transfers associated with the display engine in the communication channel. A second threshold may be set to indicate when the level of data in the display engine buffer is sufficiently high. When the dynamic priority controller compares the level of data in the display engine buffer to the second threshold and determines that the level of data in the display engine buffer is greater than or equal to the second threshold, the dynamic priority controller may decrease the priority of data transfers associated with the display engine in the communication channel. If the level of data in the display engine buffer is between the first and second thresholds, the dynamic priority controller may maintain the current priority of data transfers (i.e., either high or low priority).

In one embodiment, to adjust the priority in the situations described above, the dynamic priority controller may generate and provide a priority control signal, message or other communication information to the communication channel and/or memory controller. For example, the priority control signal may have one of multiple discreet signal values to indicate the determined priority level. In one embodiment, the communication channel may include one or more arbiters that make decisions on the order in which to process (e.g., forward on) certain pieces of data. The dynamic priority controller may provide the priority control signal to these arbiters, and based on the value of the priority control signal, the arbiters may determine which data to process next. For example, if the priority control signal has a high value (e.g., indicating that data transfers associated with the display engine should be given high priority), the arbiter may process data transfers associated with the display engine prior to processing pending data transfers associated with other clients that share the communication channel. If, however, the priority control signal has a low value (e.g., indicating that data transfers associated with the display engine should be given low priority), the arbiter may process pending data transfers associated with other clients that share the communication channel prior to processing data transfers associated with the display engine. Similarly, the memory controller can give different priority to the display requests with respect to other clients based on the dynamic priority control signal.

When the level of data in the display engine buffer is below the first threshold, the display engine may be in danger of draining the buffer completely, which can result in not being able to present pixels on the display screen or loss of the whole frame, unless the display engine buffer is populated with fresh data. Thus, the display engine cannot afford any excess latency in the transfer of data over the communication channel and/or memory controller. Accordingly, data transfers associated with the display engine should be prioritized. When the level of data in the display engine buffer is above the second threshold, the display engine can drive the display for a long period of time without needing to receive new data. Thus, some additional latency in the transfer of data over the communication channel and/or memory controller can be afforded. Accordingly, data transfers associated with the display engine can be deprioritized in relation to data transfers associated with other clients that share the communication channel and/or memory controller. This can improve the performance of these other client devices and prevent a denial of service for high bandwidth or low latency client devices.

FIG. 1 is a block diagram illustrating a computing device that dynamic priority control based on latency tolerance, according to an embodiment. In one embodiment, the computing device 100 includes processing device 110, memory 120, display engine 130 and display 140. In one embodiment, processing device 110 and display engine 130 are connected via communication channel 150. Computing device 100 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

Processing device 110 may be, for example, a multi-core processor including multiple cores and graphic processor unit (GPU). These cores may be physical processors, and may include various components such as front end units, execution units and back end units. One embodiment of multi-core processor 110 is illustrated further below with respect to FIG. 8. Processing device 110 may represent one or more general-purpose processing devices such as a microprocessor, central processing unit, or the like. Processing device 110 may implement a complex instruction set computing (CISC) architecture, a reduced instruction set computer (RISC) architecture, a very long instruction word (VLIW) architecture, or other instruction sets, or a combination of instruction sets, through translation of binary codes in the above mentioned instruction sets by a compiler. Processing device 110 may also be one or more special-purpose processing devices such as an application specific integrated circuit (ASIC), a field programmable gate array (FPGA), a digital signal processor (DSP), network processor, or the like. Processing device 110 may be configured to execute processing logic for performing the operations discussed herein.

Processing device 110 may employ execution units including logic to perform algorithms for processing data, such as in the embodiments described herein. Processing device 110 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100-executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

In this illustrated embodiment, processing device 110 includes one or more execution units 111 to implement an algorithm that is to perform at least one instruction. One embodiment may be described in the context of a single processor desktop or server system, but alternative embodiments may be included in a multiprocessor system. The processing device 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processing device 110 may be coupled to a processor bus that transmits data signals between the processing device 110 and other components in the device 100.

Execution unit 111, including logic to perform integer and floating point operations, also resides in the processing device 110. The processing device 110, in one embodiment, includes a microcode (ucode) ROM to store microcode, which when executed, is to perform algorithms for certain macroinstructions or handle complex scenarios. Here, microcode is potentially updateable to handle logic bugs/fixes for processing device 110. For one embodiment, execution unit 111 includes logic to handle a packed instruction set 113. By including the packed instruction set 113 in the instruction set of a general-purpose processing device 110, along with associated circuitry to execute the instructions, the operations used by many multimedia applications may be performed using packed data in a general-purpose processing device 110. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

In one embodiment, processing device 110 additionally includes memory controller 112. Memory controller 112 can manage the flow of data going to and from memory 120. For example, memory controller 112 can receive and process memory access requests from client devices, such as display engine 130. In addition, memory controller 112 can retrieve requested data from memory 120 and provide the data to the requesting client. In this embodiment, memory controller 112 is illustrated as being part of processing device 110. In other embodiments, however, memory controller 112 can be a separate chip or integrated into a different chip within computing device 100. For example, in another embodiment, the CPU and GPU cores of processing device 110 can be connected to one other and to an internal processor cache. Memory controller 112 may be connected externally to processing device 110 (e.g., across communication channel 150). In other embodiments, the memory controller 112 and memory clients (e.g., display engine 130) can be connected in some other fashion.

Memory 120 may include a main memory, such as read-only memory (ROM), flash memory, dynamic random access memory (DRAM) (such as synchronous DRAM (SDRAM) or Rambus DRAM (RDRAM), etc.), or a static memory, such as flash memory, static random access memory (SRAM), etc. In other embodiments, memory 120 may include some other type of storage device for storing information in a form (e.g., software, processing application) readable by a machine (e.g., a computer). The storage device may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions.

Display engine 130 may include electronic circuitry found in or associated with video or other graphics circuitry. Display engine may couple an image memory, such as display engine buffer 132, or other image source data to a display device 140 such that video or image data is processed and properly formatted for the particular display device 140. Display engine 130 may be used to convert image data that is retrieved from image memory into digital video or graphic display data that can ultimately be provided to display device 140. Display device 140 may include substantially any graphic display device along with its immediate circuitry. Examples of display devices include televisions, CRT devices, LCD display panels, LED display panels, mobile device display screens, consumer product display screens, OLED displays, projection displays, laser projection displays and 3-D display devices. Display device 140 may be any output device used to present information for visual, and in some circumstances, tactile or audio reception.

In one embodiment, communication channel 150 connects memory controller 112 of processing device 110 to display engine 130 and optionally one or more other clients (e.g., a PCIe controller). In one embodiment, communication channel 150 can include either a physical transmission medium such as wires and multiplexing arbiters, or to a logical connection over a multiplexed medium such as a radio channel. Communication channel 150 is used to convey information, for example a digital bit stream, from one or several senders (or transmitters) to one or several receivers. Communication channel 150 may have a certain capacity for transmitting information, often measured by its bandwidth in Hertz or its data rate in bits per second. In general, communicating data from one location to another requires some form of pathway or medium. Communication channel 150 may form this pathway and may include a cable (e.g., twisted-pair wire, cable, fiber-optic cable) and/or a broadcast medium (e.g., microwave, satellite, radio, infrared). In one embodiment, communication channel 150 may be shared my multiple client devices, including display engine 130.

In one embodiment, display engine 130 includes display engine buffer 132 and dynamic priority controller 160. Display engine buffer 132 can receive and store display data received from host memory controller 112, for example in video random-access memory (VRAM) or other electronic or other memory, for instance in a linear, sequential, or other format. In embodiments, display engine buffer 132 can be embedded in a video display card, discrete graphic card, integrated in a motherboard video controller, or configured in other locations of display engine 130 or computing device 100. In one embodiment, display engine buffer 132 temporarily stores data fetched from memory 120 before it is processed by display engine 130, to be displayed on display 140. Display engine 130 may then drive display 140 with the data stored in display engine buffer 132. Over time, display engine buffer 132 may be replenished with additional data received over communication channel 150 in response to requests issued by display engine 130.

In one embodiment, dynamic priority controller 160 monitors the level of data in display engine buffer 132 and compares the level of data to multiple thresholds. The thresholds can be used to determine whether to adjust the priority of data transfers associated with display engine 130 being sent across communication channel 150. For example, a first threshold may be set to indicate when the level of data in display engine buffer 132 is getting low. When dynamic priority controller 160 compares the level of data in display engine buffer 132 to the first threshold and determines that the level of data in display engine buffer 132 is less than or equal to the first threshold, dynamic priority controller 160 may increase the priority of data transfers associated with display engine 130 in communication channel 150. A second threshold may be set to indicate when the level of data in display engine buffer 132 is sufficiently high. When dynamic priority controller 160 compares the level of data in display engine buffer 132 to the second threshold and determines that the level of data in display engine buffer 132 is greater than or equal to the second threshold, dynamic priority controller 160 may decrease the priority of data transfers associated with display engine 130 in communication channel 150. If the level of data in display engine buffer 132 is between the first and second thresholds, dynamic priority controller 160 may maintain the current priority of data transfers (i.e., either high or low priority).

In one embodiment, to adjust the priority in the situations described above, dynamic priority controller 160 may generate and provide a priority control signal 134 to communication channel 150. For example, priority control signal 134 may have one of multiple discreet signal values to indicate the determined priority level. In one embodiment, communication channel 150 may include one or more arbiters that make decisions on the order in which to process (e.g., forward on) certain pieces of data. Dynamic priority controller 160 may provide priority control signal 134 to these arbiters, and based on the value of priority control signal 134, the arbiters may determine which data to process next. For example, if priority control signal 134 has a high value (e.g., indicating that data transfers associated with the display engine should be given high priority), the arbiter may process data transfers associated with display engine 130 prior to processing pending data transfers associated with other clients that share communication channel 150. If, however, priority control signal 134 has a low value (e.g., indicating that data transfers associated with the display engine should be given low priority), the arbiter may process pending data transfers associated with other clients that share communication channel 150 prior to processing data transfers associated with display engine 130. In other embodiment, other signal values may be used for priority control signal 134. For example, a low value may indicate high priority while a high value may indicate low priority. In other embodiments, the notion of priority setting can be transmitted through a message from the display engine 130 to the arbiters in the communication channel and memory controller 112.

Figure 2:
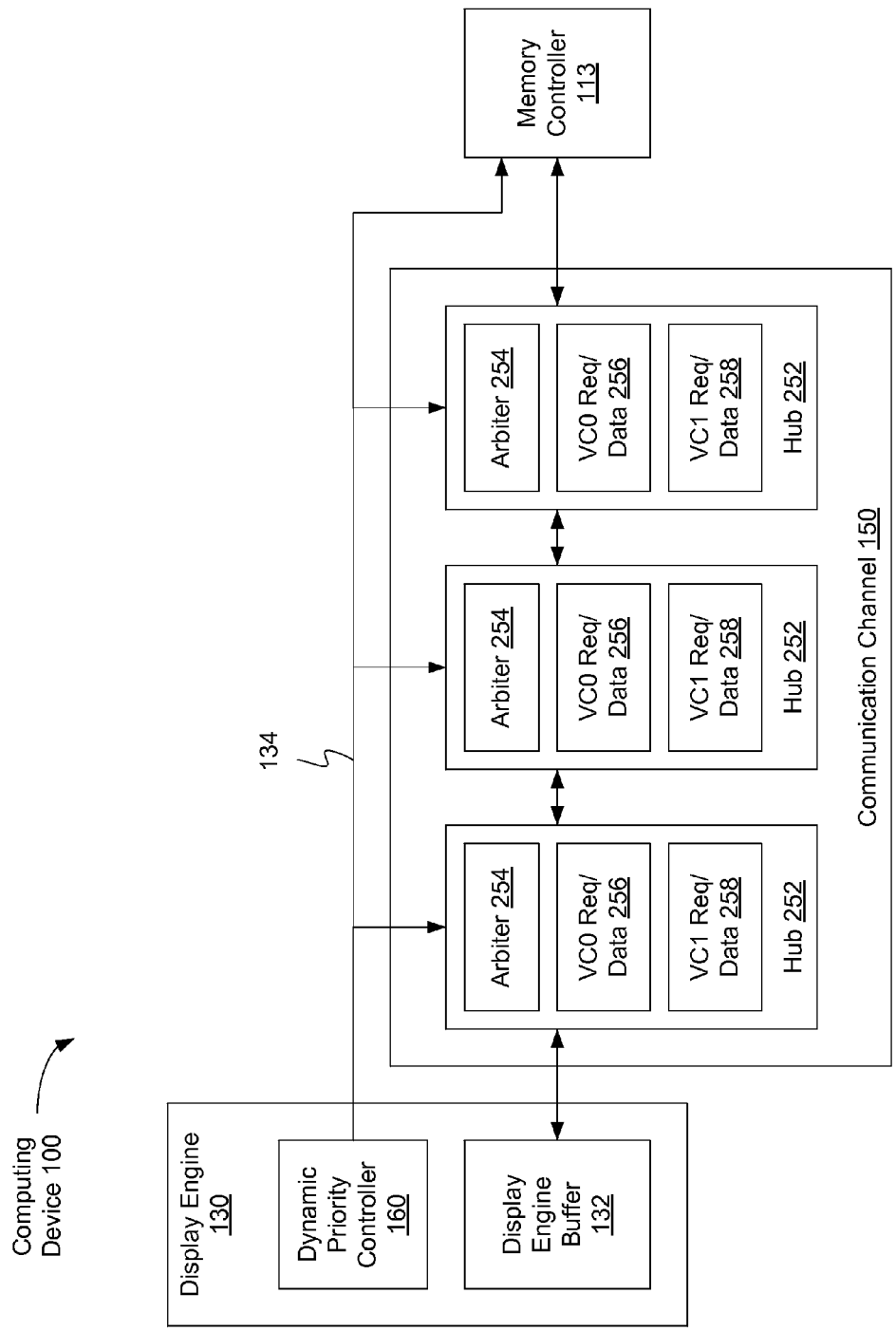
FIG. 2 is a block diagram illustrating a communication channel with dynamic priority control, according to an embodiment.

FIG. 2 is a block diagram illustrating a communication channel with dynamic priority control, according to an embodiment. As described above, communication channel 150 may connect memory controller 113 and display engine 130 to transfer requests for display data from display engine 130 to memory controller 113 and to transfer the requested display data from memory controller 113 to display engine 130. In one embodiment, communication channel 150 may be a virtual channel such that it does not include a dedicated link between two entities. Rather, a virtual channel may include one or more intermediate buffers, which may be referred to herein as hubs 252. Hubs 252 may be formed using shared resources that are individually allocated in order to form the virtual channel. Each of hubs 252 may include an arbiter 254 and a data storage that can temporarily store data (e.g., virtual channel 0 requests or data 256 and virtual channel 1 requests or data 258) during transfer between display engine 130 and memory controller 113. Each arbiter 254 may implement one or more arbitration policies that are based on the received priority control signal 134 to determine whether to process virtual channel 0 requests or data 256 or virtual channel 1 requests or data 258.

In one embodiment, if the value of priority control signal 134 is high, arbiter 254 may first process (e.g., forward on to the next hub 252 in communication channel 150) the high priority requests or data before processing the low priority requests and data. In one embodiment, the high priority requests and data may be those associated with the display engine 130, while the low priority requests and data are those associated with other client devices that share communication channel 150. For example, the high priority requests and data may be virtual channel 0 requests or data 256, while the low priority requests and data may be virtual channel 1 requests or data 258. In other embodiments, the priorities may be reversed, such that virtual channel 1 has high priority while virtual channel 0 has low priority. In one embodiment the client device (i.e., the device including dynamic priority controller 160) may be some other high bandwidth and/or low latency device besides display engine 130. In that case, the high priority requests and data may be those associated with that client device. If the value of priority control signal 134 is low, arbiter 254 may first process low priority requests or data before processing the high priority requests and data. In another embodiment, there may be requests or data associated with additional virtual channels (e.g., virtual channel N (not shown)). The arbiters 254 may determine the priority of the requests and data associated with each virtual channel relative to the other channels based on the priority control signal 134 and process those requests and data accordingly.

Figure 3:
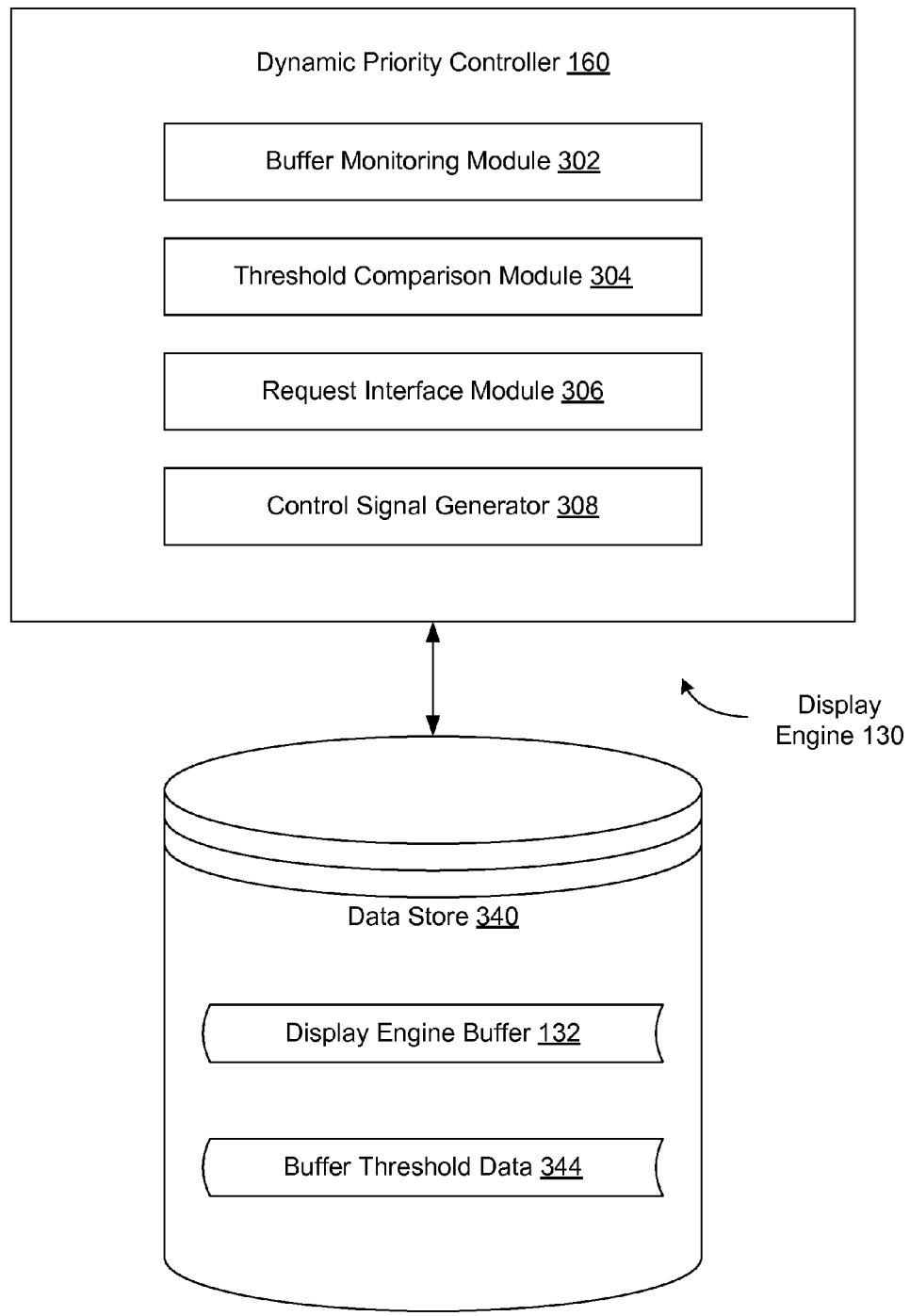
FIG. 3 is a block diagram illustrating a dynamic priority controller, according to an embodiment.

FIG. 3 is a block diagram illustrating a dynamic priority controller, according to an embodiment. In one embodiment, dynamic priority controller 160 includes buffer monitoring module 302, threshold comparison module 304, request interface module 306 and control signal generator 308. This arrangement of modules and components may be a logical separation, and in other embodiments, these modules or other components can be combined together or separated in further components, according to a particular embodiment. In one embodiment, data store 340 is connected to dynamic priority controller 160 and includes display engine buffer 132 and buffer threshold data 344. In one embodiment, display engine 130 may include both dynamic priority controller 160 and data store 340. In another embodiment, data store 340 may be external to server display engine 130 and may be connected to display engine 130 over a network or other connection. In other embodiments, display engine 130 may include different and/or additional components which are not shown to simplify the description. Data store 340 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, buffer monitoring module 302 monitors the level of data in display engine buffer 132. Buffer monitoring module 302 may periodically query display engine buffer 132 for the level of data. The level of data may be expressed in a size of the data currently stored in display engine buffer 132 (e.g., measured in bytes) or as a percentage or fraction of the capacity of display engine buffer 132 that is currently filled. In one embodiment, buffer monitoring module 302 may query display engine buffer 132 for the level of data each time new data is received over communication channel 150, each time data is removed from display engine buffer 132 to be displayed on display 140, after the expiration of some period of time (e.g., every one micro second), and/or in response to a request to determine the level of data in display engine buffer 132 received from some other component in the system. In one embodiment, buffer monitoring module 302 may store a value representing the level of data in display engine buffer 132 in data store 340.

In one embodiment, threshold comparison module 304 compares the level of data in display engine buffer 132 to one or more thresholds. The thresholds can be used to determine whether to adjust the priority of data transfers associated with display engine 130 being sent across communication channel 150. In one embodiment, the thresholds are stored as buffer threshold data 344 in data store 340. For example, a first threshold may be set to indicate when the level of data in display engine buffer 132 is getting low. When threshold comparison module 304 compares the level of data in display engine buffer 132 to the first threshold and determines that the level of data in display engine buffer 132 is less than or equal to the first threshold, dynamic priority controller 160 may increase the priority of data transfers associated with display engine 130 in the communication channel 150. In one embodiment, where display engine buffer 132 has a total size of approximately several hundred kilobytes (Kb), the first threshold may be for example, on the order of several Kb or less than one percent. In one embodiment, the first threshold is determined based on a minimum latency for transferring data across communication channel 150 and the drain rate of the buffer 132 by the display engine 130. In other embodiments, the first threshold is configurable (e.g. by driver, based on display resolution) and may be set at some other level.

A second threshold may be set to indicate when the level of data in display engine buffer 132 is sufficiently high. When threshold comparison module 304 compares the level of data in display engine buffer 132 to the second threshold and determines that the level of data in display engine buffer 132 is greater than or equal to the second threshold, dynamic priority controller 160 may decrease the priority of data transfers associated with display engine 130 in communication channel 150. In the embodiment where display engine buffer 132 has a total size of approximately several hundred kilobytes (Kb), the second threshold may be for example, 100 Kb or approximately 25-50%. In one embodiment, the second threshold is determined based on a rate of consumption of the data in display engine buffer 132 by display engine 130. In other embodiments, the second threshold is configurable and may be set at some other level based on post silicon performance tuning.

In one embodiment, request interface module 306 can receive and process requests to increase the channel priority for transfer associated with display engine 130 without regard for the current level of data in display engine buffer 132. For example, request interface module 306 may receive an indication from a power controller in computing device 100 that memory controller 112 is going to shut down for a period of time and as such, will not be able to service requests for data to replenish display engine buffer 132. In response, request interface module 306 may cause dynamic priority controller 160 to change the priority level to high priority for data transfer associated with display engine 130 until display engine buffer 132 is full. In other embodiments, a request to adjust the priority may come from some other component in computing device 100.

In one embodiment, control signal generator 308 generates and provide a priority control signal 134 to communication channel 150. For example, priority control signal 134 may have one of multiple discreet signal values to indicate the determined priority level. In one embodiment, communication channel 150 may include one or more arbiters 254 that make decisions on the order in which to process (e.g., forward on) certain pieces of data. Control signal generator 308 may provide the priority control signal 134 to these arbiters 254, and based on the value of the priority control signal 134, the arbiters 254 may determine which data to process next. For example, if the priority control signal 134 has a high value (e.g., indicating that data transfers associated with the display engine 130 should be given high priority), the arbiter 254 may process data transfers associated with the display engine 130 prior to processing pending data transfers associated with other clients that share the communication channel 150. If, however, the priority control signal 134 has a low value (e.g., indicating that data transfers associated with the display engine 130 should be given low priority), the arbiter 254 may process pending data transfers associated with other clients that share the communication channel 150 prior to processing data transfers associated with the display engine 130. In other embodiments the control signal generator 308 can generate a side band configuration message to the communication channel and memory controller.

Figure 4:
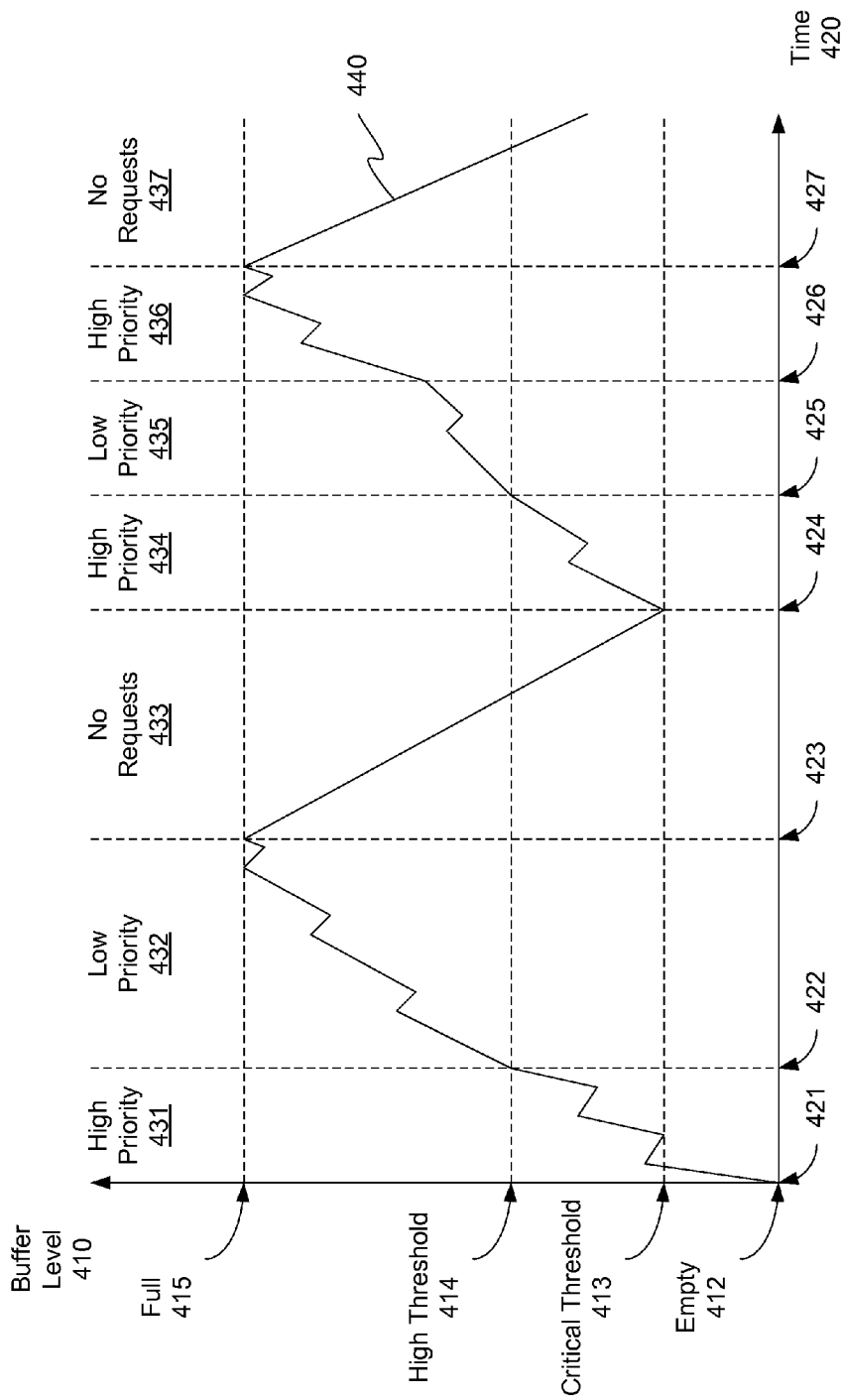
FIG. 4 is line graph illustrating the level of data in a display engine buffer over time, according to an embodiment.

FIG. 4 is line graph illustrating the level of data 410 in a display engine buffer over time 420, according to an embodiment. The line 440 represents the current level of data in display engine buffer 132 at any given point. At time 421, the display engine buffer 132 is empty 412. Dynamic priority controller 160 may set a high priority 431 for processing transfers associated with display engine 130 until the level of data 440 reaches a high data threshold 414 at time 422. At time 422, dynamic priority controller 160 may decrease the priority to a low priority 432 since the level of data 440 is greater than high threshold 414. The priority may remain low 432 until the display engine bugger 132 because full 415 at time 423. In one embodiment, there may be a period of time during which no requests for data 433 are issued by display engine 130, continuing until the level of data 440 reaches a critical threshold 413 at time 424.

At time 424, dynamic priority controller 160 may increase the priority to a high priority 434 until the level of data 440 returns to the high threshold 414 at time 425. At time 425, dynamic priority controller 160 may decrease the priority to a low priority 435 since the level of data 440 is greater than high threshold 414. In one embodiment, at time 426 dynamic priority controller 160 may receive a request to increase the priority level. In response, dynamic priority controller 160 may increase the priority to a high priority 436 until the level of data 440 reaches the capacity 415 of display engine buffer 132 at time 427. At time 427, dynamic priority controller 160 may decrease the priority level to low priority or issue no further request for data 437.

Figure 5:
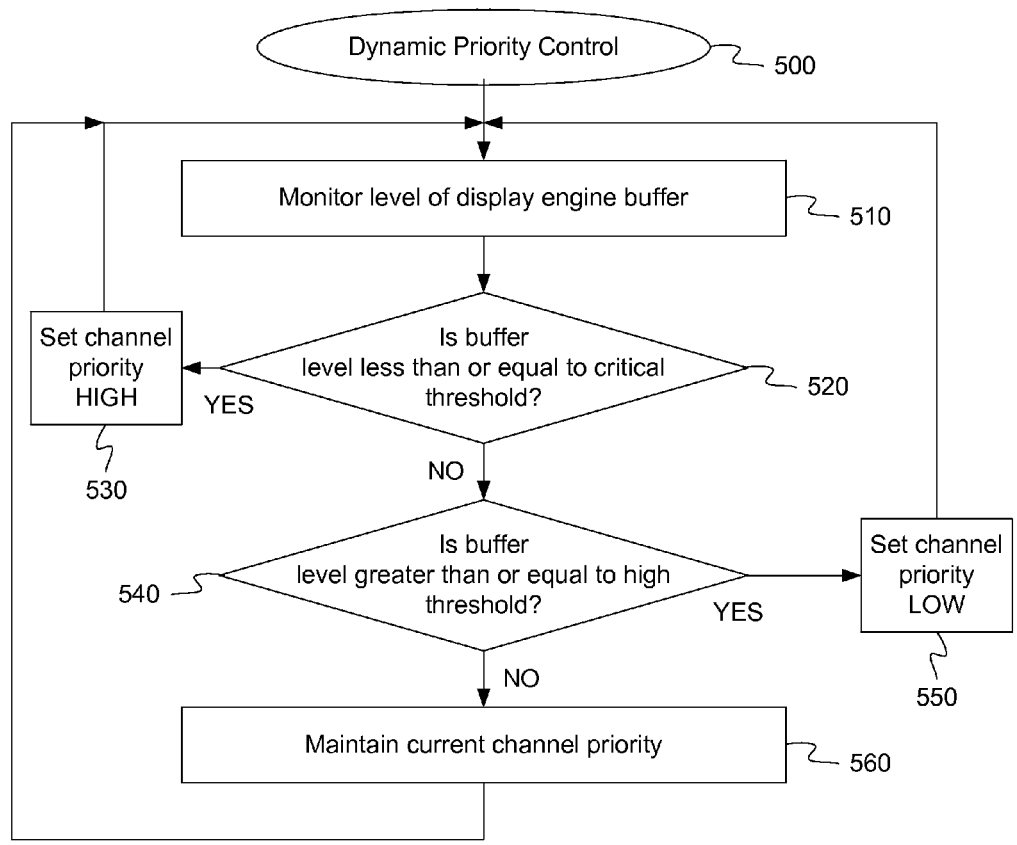
FIG. 5 is a flow diagram illustrating a method for dynamic priority control, according to an embodiment.

FIG. 5 is a flow diagram illustrating a method for dynamic priority control, according to an embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. The processing logic may dynamically control the priority level of data transfers associated with a client based on the latency tolerance of the client. In one embodiment, the method 500 is performed by dynamic priority controller 160, as shown in FIGS. 1-3.

Referring to FIG. 5, at block 510, method 500 monitors a level of data in display engine buffer 132. In one embodiment, buffer monitoring module 302 may periodically query display engine buffer 132 for the level of data. In one embodiment, buffer monitoring module 302 may query display engine buffer 132 for the level of data each time new data is received over communication channel 150, each time data is removed from display engine buffer 132 to be displayed on display 140, after the expiration of some period of time (e.g., every one micro second), and/or in response to a request to determine the level of data in display engine buffer 132 received from some other component in the system, or simply constantly monitoring every clock cycle. In one embodiment, buffer monitoring module 302 may store a value representing the level of data in display engine buffer 132 in data store 340.

At block 520, method 500 determines whether the level of data in display engine buffer 132 is less than or equal to a first threshold. In one embodiment, threshold comparison module 304 compares the level of data in display engine buffer 132 to a first (critical) threshold. The first threshold may be set to indicate when the level of data in display engine buffer 132 is getting low and can be used to determine whether to increase the priority of data transfers associated with display engine 130 being sent across communication channel 150.

If at block 520, method 500 determines that the level of data in display engine buffer 132 is less than or equal to the first threshold, at bock 530, method 500 increases the channel priority level to a high priority. In one embodiment, control signal generator 308 may generate and provide a priority control signal 134 with a high value (e.g., indicating that data transfers associated with the display engine 130 should be given high priority) to one or more arbiters in communication channel 150. In response, the arbiters 254 may process data transfers associated with the display engine 130 prior to processing pending data transfers associated with other clients that share the communication channel 150.

If at block 520, method 500 determines that the level of data in display engine buffer 132 is not less than or equal to the first threshold, at block 540, method 500 determines whether the level of data in display engine buffer 132 is greater than or equal to a second threshold. In one embodiment, threshold comparison module 304 compares the level of data in display engine buffer 132 to a second (high) threshold. The second threshold may be set to indicate when the level of data in display engine buffer 132 is sufficiently high and can be used to determine whether to decrease the priority of data transfers associated with display engine 130 being sent across communication channel 150.

If at block 540, method 500 determines that the level of data in display engine buffer 132 is greater than or equal to the second threshold, at block 550, method 500 decrease the channel priority level to a low priority. In one embodiment, control signal generator 308 may generate and provide a priority control signal 134 with a low value (e.g., indicating that data transfers associated with the display engine 130 should be given low priority) to one or more arbiters in communication channel 150. In response, the arbiters 254 may process pending data transfers associated with other clients that share the communication channel 150 prior to processing data transfers associated with the display engine 130.

If at block 540, method 500 determines that the level of data in display engine buffer 132 is not greater than or equal to the second threshold (i.e., that the data level is between the first and second threshold), at block 560, method 500 maintains the current channel priority level.

Figure 6:
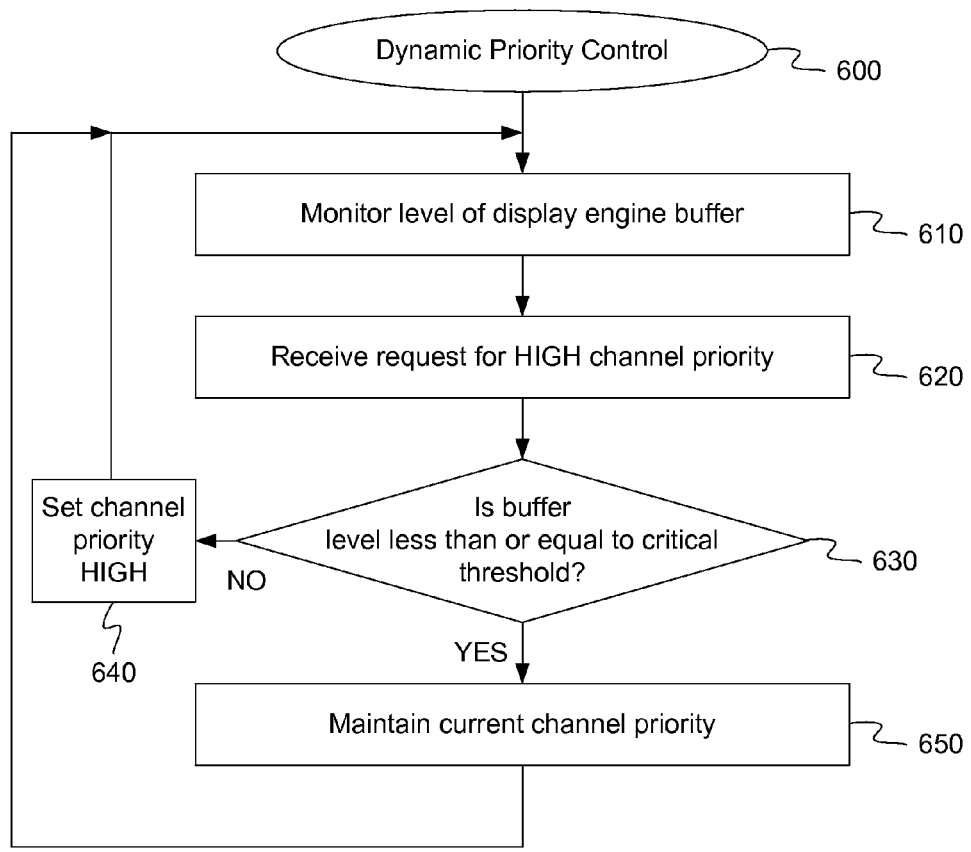
FIG. 6 is a flow diagram illustrating a method for dynamic priority control, according to an embodiment.

FIG. 6 is a flow diagram illustrating a method for dynamic priority control, according to an embodiment. The method 600 may be performed by processing logic that may comprise hardware (e.g., circuitry, dedicated logic, programmable logic, microcode, etc.), software (e.g., instructions run on a processing device to perform hardware simulation), or a combination thereof. The processing logic may dynamically control the priority level of data transfers associated with a client based on the latency tolerance of the client. In one embodiment, the method 600 is performed by dynamic priority controller 160, as shown in FIGS. 1-3.

Referring to FIG. 6, at block 610, method 600 monitors a level of data in display engine buffer 132. At block 6, method 600 receives a request to increase the channel priority to a high priority. In one embodiment, request interface module 306 can receive and process requests to increase the channel priority for transfer associated with display engine 130 without regard for the current level of data in display engine buffer 132. For example, request interface module 306 may receive an indication from a power controller in computing device 100 that memory controller 112 is going to shut down for a period of time and as such, will not be able to service requests for data to replenish display engine buffer 132. In other embodiments, a request to adjust the priority may come from some other component in computing device 100.

At block 630, method 600 determines whether the level of data in display engine buffer 132 is less than or equal to a first threshold. In one embodiment, threshold comparison module 304 compares the level of data in display engine buffer 132 to a first (critical) threshold. The first threshold may be set to indicate when the level of data in display engine buffer 132 is getting low and can be used to determine whether to increase the priority of data transfers associated with display engine 130 being sent across communication channel 150.

If at block 630, method 600 determines that the level of data in display engine buffer 132 is not less than or equal to the first threshold, at bock 640, method 600 increases the channel priority level to a high priority. In one embodiment, control signal generator 308 may generate and provide a priority control signal 134 with a high value (e.g., indicating that data transfers associated with the display engine 130 should be given high priority) to one or more arbiters in communication channel 150. In response, the arbiters 254 may process data transfers associated with the display engine 130 prior to processing pending data transfers associated with other clients that share the communication channel 150. The priority level may remain at a high priority for data transfers associated with display engine 130 until display engine buffer 132 is full.

If at block 630, method 600 determines that the level of data in display engine buffer 132 is less than or equal to the first threshold, at bock 650, method 600 maintains the current maintains the current channel priority, which should already be at a high priority.

Figure 7:
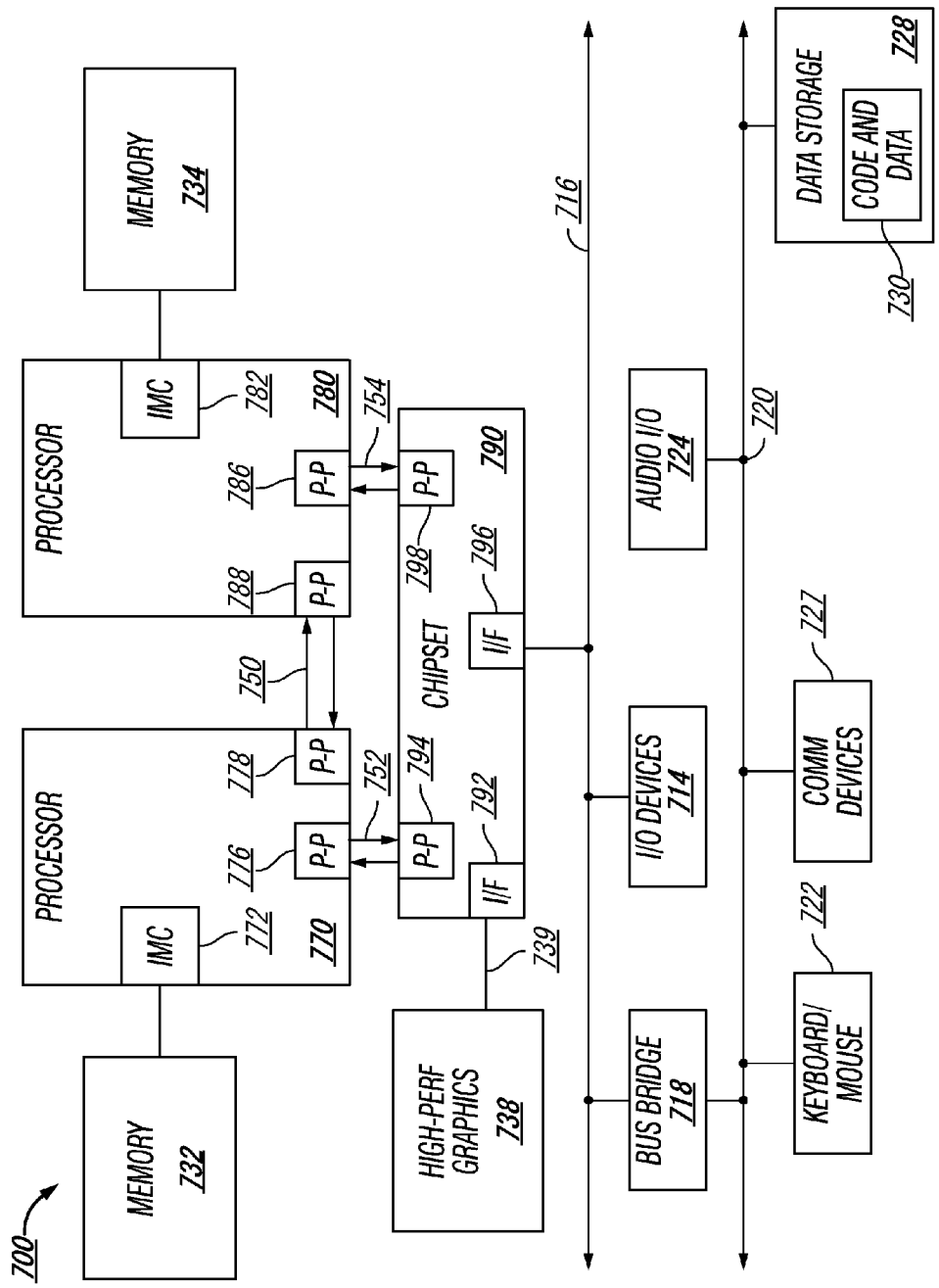
FIG. 7 is a block diagram of a computer system according to one embodiment.

Referring now to FIG. 7, shown is a block diagram of a system 700 in accordance with an embodiment. As shown in FIG. 7, multiprocessor system 700 is a point-to-point interconnect system, and includes a first processor 770 and a second processor 780 coupled via a point-to-point interconnect 750. Each of processors 770 and 780 may be some version of the processing device 110, as shown in FIG. 1.

While shown with only two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, integrated memory controllers (IMCs) 772 and 782 couple the processors to respective memories, namely a memory 732 and a memory 734, which may be portions of main memory locally attached to the respective processors.

Processors 770 and 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
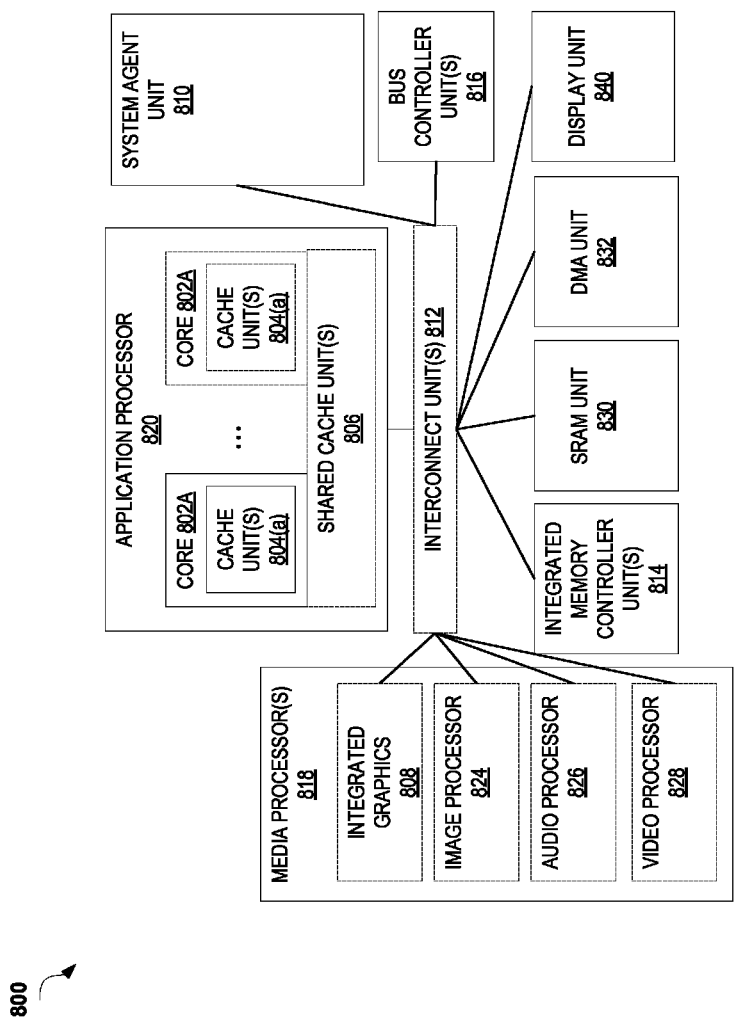
FIG. 8 is a block diagram of a system on chip (SoC) in accordance with an embodiment of the present disclosure.

Embodiments may be implemented in many different system types. FIG. 8 is a block diagram of a SoC 800 in accordance with an embodiment of the present disclosure. Dashed lined boxes are optional features on more advanced SoCs. In FIG. 8, an interconnect unit(s) 812 is coupled to: an application processor 820 which includes a set of one or more cores 802A-N and shared cache unit(s) 806; a system agent unit 810; a bus controller unit(s) 816; an integrated memory controller unit(s) 814; a set or one or more media processors 818 which may include integrated graphics logic 808, an image processor 824 for providing still and/or video camera functionality, an audio processor 826 for providing hardware audio acceleration, and a video processor 828 for providing video encode/decode acceleration; an static random access memory (SRAM) unit 830; a direct memory access (DMA) unit 832; and a display unit 840 for coupling to one or more external displays. In one embodiment, a memory module may be included in the integrated memory controller unit(s) 814. In another embodiment, the memory module may be included in one or more other components of the SoC 800 that may be used to access and/or control a memory. The application processor 820 may include a microcode context and aliased parameter passing logic as described in embodiments herein.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. In some embodiments, one or more of the cores 802A-N are capable of multi-threading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing only a subset of that instruction set or a different instruction set.

The application processor 820 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 820 may be from another company, such as ARM Holdings™, Ltd, MIPS™, etc. The application processor 820 may be a special-purpose processor, such as, for example, a network or communication processor, compression engine, graphics processor, co-processor, embedded processor, or the like. The application processor 820 may be implemented on one or more chips. The application processor 820 may be a part of and/or may be implemented on one or more substrates using any of a number of process technologies, such as, for example, BiCMOS, CMOS, or NMOS.

Figure 9:
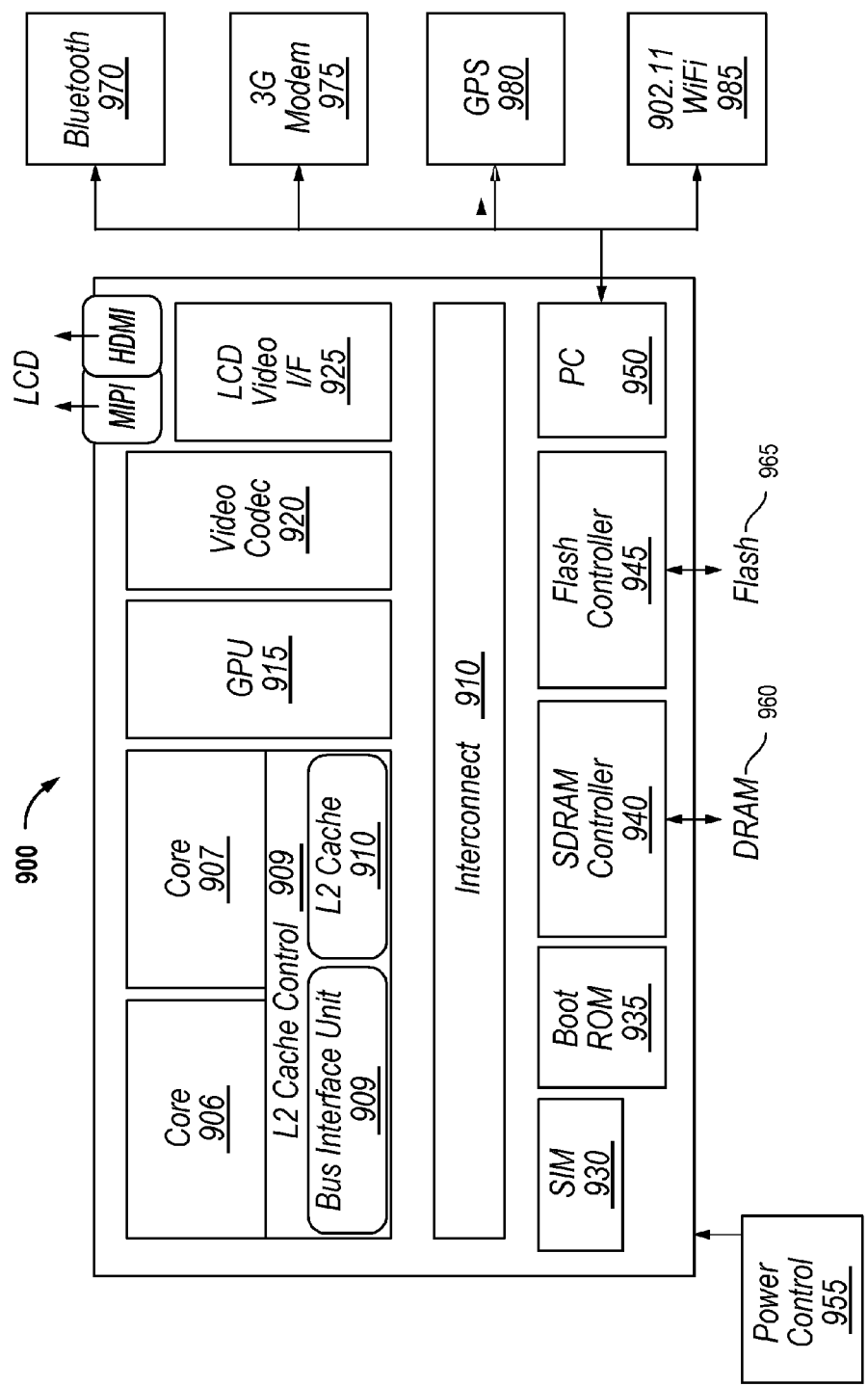
FIG. 9 is a block diagram of an embodiment of a system on-chip (SOC) design.

FIG. 9 is a block diagram of an embodiment of a system on-chip (SoC) design in accordance with the present disclosure. As a specific illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 900 includes two cores-906 and 907. Cores 906 and 907 may conform to an Instruction Set Architecture, such as an Intel® Architecture Core™ based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 910 includes an on-chip interconnect, such as an IOSF, AMBA, or other interconnect discussed above, which potentially implements one or more aspects of the described disclosure. In one embodiment, a microcode context and aliased parameter passing logic may be included in cores 906, 907.

Interconnect 910 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the disclosure described herein. In addition, the system 900 illustrates peripherals for communication, such as a Bluetooth module 970, 3G modem 975, GPS 980, and Wi-Fi 985.

The following examples pertain to further embodiments.

Example 1 is an apparatus comprising 1) a data buffer; and 2) a dynamic priority controller coupled to the data buffer, the dynamic priority controller to monitor a level of data in the data buffer, compare the level of data in the data buffer to a plurality of thresholds, the plurality of thresholds comprising a first threshold and a second threshold, when the level of data in the data buffer is less than or equal to the first threshold, increase a priority for processing data associated with the data buffer in a communication channel, and when the level of data in the data buffer is greater than or equal to the second threshold, decrease the priority for processing data associated with the data buffer in the communication channel.

In Example 2, the apparatus of Example 1 can optionally include when the level of data in the data buffer is greater than the first threshold hold and less than the second threshold, maintain a current priority for processing data associated with the data buffer in the communication channel.

In Example 3, the apparatus of Example 1, can optionally include the first threshold being less than the second threshold.

In Example 4, the apparatus of Example 3, can optionally include the first threshold comprising a value based on a minimum latency for transferring data across the communication channel, and the second threshold comprising a value based on a rate of consumption of the data in the data buffer.

In Example 5, the apparatus of Example 1, can optionally include the communication channel being shared by a plurality of client devices including the data buffer and the communication channel to transfer data between a memory controller and the plurality of client devices.

In Example 6, the apparatus of Example 5, can optionally include to increase the priority for processing data associated with the data buffer in the communication channel, the dynamic priority controller to provide a priority control signal to an arbiter in the communication channel, the priority control signal to cause the arbiter to process data associated with the data buffer prior to processing data for other client devices of the plurality of client devices.

In Example 7, the apparatus of Example 5, can optionally include to decrease the priority for processing data associated with the data buffer in the communication channel, the dynamic priority controller to provide a priority control signal to an arbiter in the communication channel, the priority control signal to cause the arbiter to process data for other client devices of the plurality of client devices prior to processing data associated with the data buffer.

Example 8 is a system comprising 1) a processing device comprising a memory controller, 2) a communication channel coupled to the processing device, and 3) a display engine coupled to the communication channel, the display engine comprising a display engine buffer and a dynamic priority controller, the dynamic priority controller to monitor a level of data in the display engine buffer, compare the level of data in the display engine buffer to a plurality of thresholds, the plurality of thresholds comprising a first threshold and a second threshold, when the level of data in the display engine buffer is less than or equal to the first threshold, increase a priority for processing display engine data in the communication channel, and when the level of data in the display engine buffer is greater than or equal to the second threshold, decrease the priority for processing the display engine data in the communication channel.

In Example 9, the system of Example 8, can optionally include the dynamic priority controller further to when the level of data in the display engine buffer is greater than the first threshold hold and less than the second threshold, maintain a current priority for processing the display engine data in the communication channel.

In Example 10, the system of Example 8, can optionally include the first threshold comprising a value based on a minimum latency for transferring data across the communication channel, and the second threshold comprising a value based on a rate of consumption of the data in the display engine buffer by the display engine.

In Example 11, the system of Example 8, can optionally include the communication channel being shared by a plurality of client devices including the display engine buffer and the communication channel to transfer data between the memory controller and the plurality of client devices.

In Example 12, the system of Example 11, can optionally include increasing the priority for processing display engine data in the communication channel by providing a priority control signal to an arbiter in the communication channel, the priority control signal to cause the arbiter to process the display engine data prior to processing data for other client devices of the plurality of client devices.

In Example 13, the system of Example 11, can optionally include decreasing the priority for processing display engine data in the communication channel by providing a priority control signal to an arbiter in the communication channel, the priority control signal to cause the arbiter to process data for other client devices of the plurality of client devices prior to processing the display engine data.

Example 14 is a method comprising 1) monitoring a level of data in a display engine buffer, 2) comparing, by a processing device, the level of data in the display engine buffer to a plurality of thresholds, the plurality of thresholds comprising a first threshold and a second threshold, 3) when the level of data in the display engine buffer is less than or equal to the first threshold, increasing a priority for processing display engine data in a communication channel, and 4) when the level of data in the display engine buffer is greater than or equal to the second threshold, decreasing the priority for processing the display engine data in the communication channel.

In Example 15, the method of Example 14 can optionally further comprise when the level of data in the display engine buffer is greater than the first threshold hold and less than the second threshold, maintaining a current priority for processing the display engine data in the communication channel.

In Example 16, the method of Example 14, can optionally include the first threshold being less than the second threshold.

In Example 17, the method of Example 16, can optionally include the first threshold comprising a value based on a minimum latency for transferring data across the communication channel, and the second threshold comprising a value based on a rate of consumption of the data in the display engine buffer by a display engine comprising the display engine buffer.

In Example 18, the method of Example 14, can optionally include the communication channel being shared by a plurality of client devices including the display engine buffer and the communication channel to transfer data between a memory controller and the plurality of client devices.

In Example 19, the method of Example 18, can optionally include increasing the priority for processing display engine data in the communication channel comprises providing a priority control signal to an arbiter in the communication channel, the priority control signal to cause the arbiter to process the display engine data prior to processing data for other client devices of the plurality of client devices.

In Example 20, the method of Example 18, can optionally include decreasing the priority for processing display engine data in the communication channel comprises providing a priority control signal to an arbiter in the communication channel, the priority control signal to cause the arbiter to process data for other client devices of the plurality of client devices prior to processing the display engine data.

Example 21 is an apparatus comprising 1) means for monitoring a level of data in a display engine buffer, 2) means for comparing the level of data in the display engine buffer to a plurality of thresholds, the plurality of thresholds comprising a first threshold and a second threshold, 3) means for increasing a priority for processing display engine data in a communication channel when the level of data in the display engine buffer is less than or equal to the first threshold, and 4) means for decreasing the priority for processing the display engine data in the communication channel when the level of data in the display engine buffer is greater than or equal to the second threshold.

In Example 22, the apparatus of Example 21, can optionally include means for maintaining a current priority for processing the display engine data in the communication channel when the level of data in the display engine buffer is greater than the first threshold hold and less than the second threshold.

In Example 23, the apparatus of Example 21, can optionally include the first threshold being less than the second threshold.

In Example 24, the apparatus of Example 23, can optionally include the first threshold comprising a value based on a minimum latency for transferring data across the communication channel, and the second threshold comprising a value based on a rate of consumption of the data in the display engine buffer by a display engine comprising the display engine buffer.

In Example 25, the apparatus of Example 21, can optionally include the communication channel being shared by a plurality of client devices including the display engine buffer and the communication channel to transfer data between a memory controller and the plurality of client devices.

In Example 26, the apparatus of Example 25, can optionally include the means for increasing the priority for processing display engine data in the communication channel comprising means for providing a priority control signal to an arbiter in the communication channel, the priority control signal to cause the arbiter to process the display engine data prior to processing data for other client devices of the plurality of client devices.

In Example 27, the apparatus of Example 25, can optionally include the means for decreasing the priority for processing display engine data in the communication channel comprising means for providing a priority control signal to an arbiter in the communication channel, the priority control signal to cause the arbiter to process data for other client devices of the plurality of client devices prior to processing the display engine data.

Example 28 is an apparatus comprising 1) a memory and 2) a computing system coupled to the memory, wherein the computing system is configured to perform the method of an one of Examples 14-20.

In Example 29, the apparatus of Example 28, can optionally include the computing system comprising a processing device, a memory controller, a display engine and a communication channel.

In Example 30, the apparatus of Example 29, can optionally include the display engine comprising a display engine buffer.

Example 31 is a method comprising 1) monitoring a level of data in a client data buffer and 2) comparing, by a processing device, the level of data in the client data buffer to a plurality of thresholds, the plurality of thresholds comprising a first threshold and a second threshold and 3) controlling a priority of data requests for the client data buffer in a communication channel based on the comparing of the level of data to the first and second thresholds.

In Example 32, the method of Example 31, can optionally include controlling the priority by when the level of data in the client data buffer is less than or equal to the first threshold, increasing a priority for processing the data requests in the communication channel and when the level of data in the client data buffer is greater than or equal to the second threshold, decreasing the priority for processing the data requests in the communication channel.

In Example 33, the method of Example 31, can optionally include controlling the priority by when the level of data in the client data buffer is greater than the first threshold hold and less than the second threshold, maintaining a current priority for processing the data requests in the communication channel.

In Example 34, the method of Example 31, can optionally include the communication channel being shared by a plurality of client devices including the client data buffer and wherein the communication channel to transfer data between a memory controller and the plurality of client devices.

In Example 35, the method of Example 32, can optionally include increasing the priority for processing the data requests in the communication channel by providing a priority control signal to an arbiter in the communication channel, the priority control signal to cause the arbiter to process the data requests prior to processing data for other client devices.

In Example 36, the method of Example 32, can optionally include decreasing the priority for processing the data requests in the communication channel by providing a priority control signal to an arbiter in the communication channel, the priority control signal to cause the arbiter to process data for other client devices prior to processing the data requests.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular embodiments may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An apparatus comprising:
a data buffer; and
dynamic priority controller coupled to the data buffer, the dynamic priority controller to:
monitor a level of data in the data buffer;
compare the level of data in the data buffer to a plurality of thresholds, the plurality of thresholds comprising a first threshold and a second threshold;
when the level of data in the data buffer satisfies a condition pertaining to the first threshold, increase a priority for processing data associated with the data buffer in a communication channel;
when the level of data in the data buffer satisfies a condition pertaining to the second threshold, decrease the priority for processing data associated with the data buffer in the communication channel; and
when the level of data in the data buffer does not satisfy the condition pertaining to the first threshold and does not satisfy the condition pertaining to the second threshold, maintain a current priority for processing data associated with the data buffer in the communication channel.

2. The apparatus of claim 1, wherein the first threshold is less than the second threshold.

3. The apparatus of claim 2, wherein the first threshold comprises a value based on a minimum latency for transferring data across the communication channel, and wherein the second threshold comprises a value based on a rate of consumption of the data in the data buffer.

4. The apparatus of claim 1, wherein the communication channel is shared by a plurality of client devices including the data buffer and wherein the communication channel to transfer data between a memory controller and the plurality of client devices.

5. The apparatus of claim 4, wherein to increase the priority for processing data associated with the data buffer in the communication channel, the dynamic priority controller to provide a priority control signal to an arbiter in the communication channel, the priority control signal to cause the arbiter to process data associated with the data buffer prior to processing data for other client devices of the plurality of client devices.

6. The apparatus of claim 4, wherein to decrease the priority for processing data associated with the data buffer in the communication channel, the dynamic priority controller to provide a priority control signal to an arbiter in the communication channel, the priority control signal to cause the arbiter to process data for other client devices of the plurality of client devices prior to processing data associated with the data buffer.

7. A system comprising:
a processing device comprising a memory controller;
a communication channel coupled to the processing device; and
a display engine coupled to the communication channel, the display engine comprising a display engine buffer and a dynamic priority controller, the dynamic priority controller to:
monitor a level of data in the display engine buffer;
compare the level of data in the display engine buffer to a plurality of thresholds, the plurality of thresholds comprising a first threshold and a second threshold;
when the level of data in the display engine buffer satisfies a condition pertaining to the first threshold, increase a priority for processing display engine data in the communication channel;
when the level of data in the display engine buffer satisfies a condition pertaining to the second threshold, decrease the priority for processing the display engine data in the communication channel; and
when the level of data in the data buffer does not satisfy the condition pertaining to the first threshold and does not satisfy the condition pertaining to the second threshold, maintain a current priority for processing data associated with the data buffer in the communication channel.

8. The system of claim 7, wherein the first threshold comprises a value based on a minimum latency for transferring data across the communication channel, and wherein the second threshold comprises a value based on a rate of consumption of the data in the display engine buffer by the display engine.

9. The system of claim 7, wherein the communication channel is shared by a plurality of client devices including the display engine buffer and wherein the communication channel to transfer data between the memory controller and the plurality of client devices.

10. The system of claim 9, wherein increasing the priority for processing display engine data in the communication channel comprises providing a priority control signal to an arbiter in the communication channel, the priority control signal to cause the arbiter to process the display engine data prior to processing data for other client devices of the plurality of client devices.

11. The system of claim 9, wherein decreasing the priority for processing display engine data in the communication channel comprises providing a priority control signal to an arbiter in the communication channel, the priority control signal to cause the arbiter to process data for other client devices of the plurality of client devices prior to processing the display engine data.

12. A method comprising:
monitoring a level of data in a display engine buffer;
comparing, by a processing device, the level of data in the display engine buffer to a plurality of thresholds, the plurality of thresholds comprising a first threshold and a second threshold;
when the level of data in the display engine buffer satisfies a condition pertaining to the first threshold, increasing a priority for processing display engine data in a communication channel;
when the level of data in the display engine buffer satisfies a condition pertaining to the second threshold, decreasing the priority for processing the display engine data in the communication channel; and
when the level of data in the data buffer does not satisfy the condition pertaining to the first threshold and does not satisfy the condition pertaining to the second threshold, maintain a current priority for processing data associated with the data buffer in the communication channel.

13. The method of claim 12, wherein the first threshold is less than the second threshold.

14. The method of claim 13, wherein the first threshold comprises a value based on a minimum latency for transferring data across the communication channel, and wherein the second threshold comprises a value based on a rate of consumption of the data in the display engine buffer by a display engine comprising the display engine buffer.

15. The method of claim 12, wherein the communication channel is shared by a plurality of client devices including the display engine buffer and wherein the communication channel to transfer data between a memory controller and the plurality of client devices.

16. The method of claim 15, wherein increasing the priority for processing display engine data in the communication channel comprises providing a priority control signal to an arbiter in the communication channel, the priority control signal to cause the arbiter to process the display engine data prior to processing data for other client devices of the plurality of client devices.

17. The method of claim 15, wherein decreasing the priority for processing display engine data in the communication channel comprises providing a priority control signal to an arbiter in the communication channel, the priority control signal to cause the arbiter to process data for other client devices of the plurality of client devices prior to processing the display engine data.

\* \* \* \* \*